(12) United States Patent
DiCarlo (10) Patent No.: US 9,121,544 B2
(45) Date of Patent: Sep. 1, 2015

(54) ADJUSTABLE MOUNTING SHOE AND RELATED METHODS THEREOF

(71) Applicant: American Creative Machine Enterprise, LLC, Manchester, NH (US)

(72) Inventor: Joseph DiCarlo, Chester, NH (US)

(73) Assignee: Robert J. McCreight, Jr., San Antonio, TX (US)

( * ) Notice: Subject to any disclaimer, the term of this patent is extended or adjusted under 35 U.S.C. 154(b) by 57 days.

(21) Appl. No.: 13/896,721

(22) Filed: May 17, 2013

(65) Prior Publication Data

US 2014/0239138 A1 Aug. 28, 2014

Related U.S. Application Data

(60) Provisional application No. 61/768,002, filed on Feb. 22, 2013.

(51) Int. Cl.
| | |
|---|---|
| *F16M 11/02* | (2006.01) |
| *F16M 13/02* | (2006.01) |
| *F16M 11/04* | (2006.01) |
| *F16M 13/00* | (2006.01) |

(52) U.S. Cl.
CPC ............ *F16M 13/02* (2013.01); *F16M 11/041* (2013.01); *F16M 13/00* (2013.01); *Y10T 29/49826* (2015.01)

(58) Field of Classification Search
CPC .............. F41G 1/16; F41G 1/22; F41G 1/28; F41G 1/38; F41G 11/001; F41G 11/003; F41G 11/004; F16M 11/041; F16M 13/02; A42B 3/042; A42B 3/04; G02B 23/125; G02B 27/0149; G02B 2027/0138; G02B 2027/0156

USPC .............. 248/274.1, 220.21, 221.11, 222.13, 248/222.14, 223.31, 223.41, 177.1, 178.1, 248/187.1, 682; 42/124, 125, 127; 2/6.6, 2/422

See application file for complete search history.

(56) References Cited

U.S. PATENT DOCUMENTS

| | | | | |
|---|---|---|---|---|
| 3,628,761 | A * | 12/1971 | Thomas, Jr. ............... | 248/184.1 |
| 4,929,973 | A * | 5/1990 | Nakatani .................... | 248/177.1 |
| 5,307,204 | A | 4/1994 | Dor | |
| 5,331,459 | A | 7/1994 | Dor | |
| 5,339,464 | A | 8/1994 | Dor | |
| D358,830 | S | 5/1995 | Dor | |
| 5,914,816 | A | 6/1999 | Soto et al. | |
| 6,196,504 | B1 * | 3/2001 | Lemke ....................... | 248/187.1 |
| 6,457,179 | B1 | 10/2002 | Prendergast | |
| 6,472,776 | B1 | 10/2002 | Soto et al. | |
| 6,751,810 | B1 | 6/2004 | Prendergast | |
| 6,773,172 | B1 * | 8/2004 | Johnson et al. ............... | 396/428 |
| 6,811,348 | B1 * | 11/2004 | Meyer et al. .................. | 403/325 |
| 6,862,748 | B2 | 3/2005 | Prendergast | |
| 6,938,276 | B1 | 9/2005 | Prendergast | |
| 6,957,449 | B2 | 10/2005 | Prendergast | |
| 6,986,162 | B2 | 1/2006 | Soto et al. | |

(Continued)

*Primary Examiner* — Anita M King
(74) *Attorney, Agent, or Firm* — Hayes Soloway PC (57) ABSTRACT

An adjustable mounting shoe and related methods is disclosed. The adjustable mounting shoe includes a shoe body. A middle portion of the shoe body has a pocket formed therein. A pocket insert is positioned at least partially within the pocket. The pocket insert has a raised edge, wherein the pocket insert is movable relative to the shoe body. At least one fastener is engageable with the pocket insert to secure the pocket insert in a stationary position at least partially within the pocket.

15 Claims, 11 Drawing Sheets

(56) References Cited

U.S. PATENT DOCUMENTS

| | | |
|---|---|---|
| 7,219,370 B1 * | 5/2007 | Teetzel et al. ............... 2/6.2 |
| 7,418,738 B2 | 9/2008 | Prendergast |
| 7,444,683 B2 | 11/2008 | Prendergast et al. |
| 7,504,918 B2 | 3/2009 | Prendergast et al. |
| 7,649,701 B2 | 1/2010 | Prendergast et al. |
| 7,658,556 B2 * | 2/2010 | Johnson ............... 396/428 |
| 7,735,159 B2 | 6/2010 | Prendergast |
| 7,823,316 B2 * | 11/2010 | Storch et al. ............... 42/90 |
| 7,996,917 B2 | 8/2011 | Prendergast |
| 8,238,045 B2 | 8/2012 | Prendergast et al. |
| 8,239,971 B2 | 8/2012 | Prendergast |
| 8,337,036 B2 | 12/2012 | Soto et al. |
| 8,739,313 B2 * | 6/2014 | Teetzel et al. ............... 2/6.6 |
| 2014/0239146 A1 * | 8/2014 | DiCarlo ............... 248/682 |

\* cited by examiner

ADJUSTABLE MOUNTING SHOE AND RELATED METHODS THEREOF

CROSS REFERENCE TO RELATED APPLICATION

This application claims benefit of U.S. Provisional Application Ser. No. 61/768,002, entitled, "Optical Device Mounting Apparatus and Adjustable Mounting Shoe" filed Feb. 22, 2013, the entire disclosure of which is incorporated herein by reference.

FIELD OF THE DISCLOSURE

The present disclosure is generally related to mounting devices and more particularly is related to an adjustable mounting shoe and related methods thereof.

BACKGROUND OF THE DISCLOSURE

Optical devices are commonly used in various environments to enhance the capabilities of the user's vision. In military environments, various optical devices are used to give a soldier enhanced visibility in harsh conditions. For example, devices like the PVS 14 night vision monocular are commonly used in the military to enhance a soldier's visibility in low light conditions. These optical devices are affixed to combat helmets, weapons, or other structures that a soldier uses, and during a field operation, a soldier may move the optical device between the various mounting structures.

Figure 1:
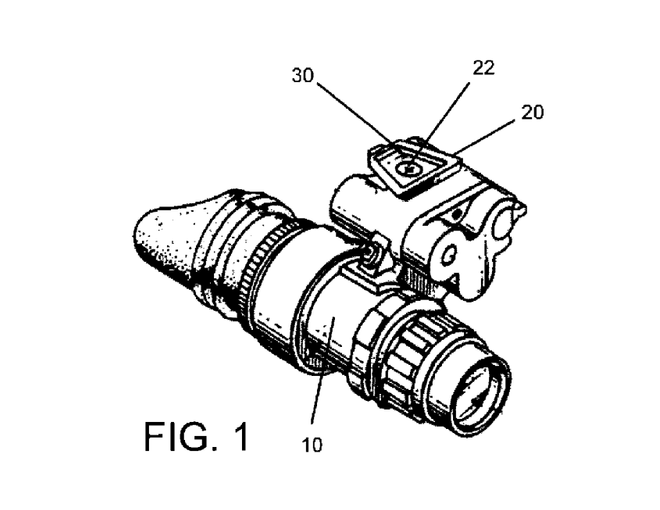
FIGS. 1-3 are illustrations of an optical device mounting system, in accordance with the prior art.
Figure 2:
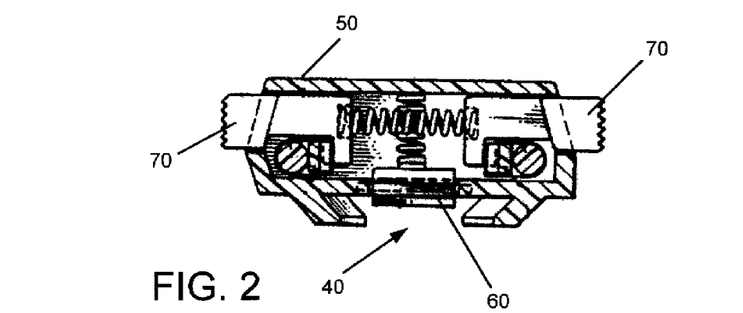
Figure 3:
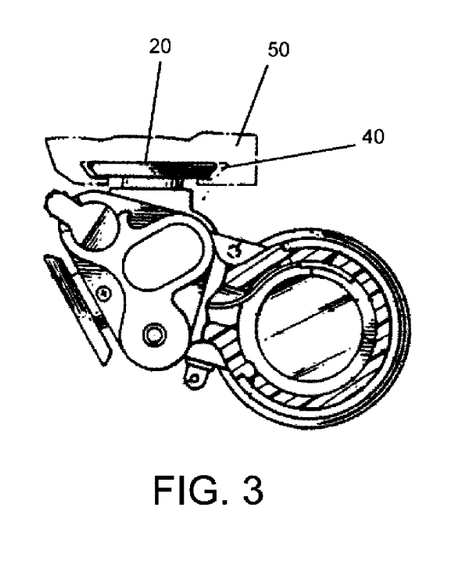

The use of a shoe to secure an optical device to a mounting structure, such as a combat helmet or a weapon, is well-known in the art. FIGS. 1-3 are illustrations of an optical device mounting system, in accordance with the prior art. As is shown, the optical device 10 has a mounting shoe 20 secured thereto, such as with fastener 22. A pocket 30 is formed within the mounting shoe 20 (FIG. 1). The mounting shoe 20 engages with a receiver 40 of a mounting structure 50, as may be positioned on a combat helmet or weapon. A locking arm 60 protrudes into the receiver 40 such that when the mounting shoe 20 is engaged with the receiver 40, the locking arm 60 engages with the pocket 30 to securely retain the mounting shoe 20 within the receiver 40. To disengage the mounting shoe 20 from the receiver 40, the locking arm 60 may be withdrawn from engagement with the pocket 30, such as with buttons 70.

The optical device mounting system shown in FIGS. 1-3 is one type of mounting system—many others exist within the art. The shoe may have various designs, depending on the mounting structure the optical device is mounted to, and it is beneficial for the various designs of the shoe to be interchangeable with different mounts. There are two main types of conventional shoes: a shoe for engagement with a butterfly clip commonly used to mount optical devices to weapons; and a shoe 30 with a pocket, commonly used to mount optical devices to a combat helmet. Both types of conventional shoes are static, unitary structures with a dovetail shape and a plurality of angled sidewalls which allow the shoe to engage with a receiver. The shoe for engagement with the butterfly clip utilizes an angled back surface, such as a 10° angle along the edge at the wide end of the dovetail shape, to engage with a butterfly clip when the shoe is inserted in to the mounting receiver. The shoe with the pocket is secured within the mounting receiver with a retractable locking mount which moves into the pocket to engage with the shoe.

While both types of shoes have been used for some time, manufacturing a shoe that is successful with both the butterfly clip engagement and the pocket engagement has proved difficult. The shoe must be manufactured with extremely precise tolerances to allow the shoe to engage with the mounting receiver properly. Often times, a shoe with both types of engagement may fit with the butterfly clip but not fit with the pocket, or vice versa. It is often difficult for manufactures to control the tolerances needed for the butterfly clip engagement, and failing to do so can prevent proper mounting of the optical device. For example, if the tolerance between the angled edge of the shoe and the butterfly clip is too large, the shoe may be too loose within the mounting receiver, whereas if the tolerance is too small, the shoe may not lock within the mounting receiver at all, or the butterfly clip may become jammed and not allow the shoe to be released.

Thus, a heretofore unaddressed need exists in the industry to address the aforementioned deficiencies and inadequacies.

SUMMARY OF THE DISCLOSURE

Embodiments of the present disclosure provide an adjustable mounting shoe. Briefly described, in architecture, one embodiment of the adjustable mounting shoe, among others, can be implemented as follows. The adjustable mounting shoe has a shoe body. A middle portion of the shoe body has a pocket formed therein. A pocket insert is positioned at least partially within the pocket. The pocket insert has a raised edge, wherein the pocket insert is movable relative to the shoe body. At least one fastener is engageable with the pocket insert to secure the pocket insert in a stationary position at least partially within the pocket.

The present disclosure can also be viewed as providing an adjustable optical device mount. Briefly described, in architecture, one embodiment of the adjustable optical device mount, among others, can be implemented as follows. The adjustable optical device mount includes a base plate secured to an optical device. A shoe body is mounted to the base plate, wherein a middle portion of the shoe body has a pocket formed therein. A pocket insert is removably secured at least partially within the pocket, wherein a position of the pocket insert is adjustable between a plurality of positions within the pocket. A mounting structure has a receiving area and a locking device, wherein the shoe body is at least partially positioned within the receiving area, and wherein the locking structure engages with the pocket insert to retain the shoe body within the receiving area.

The present disclosure can also be viewed as providing a method of manufacturing an adjustable mounting shoe. In this regard, one embodiment of such a method, among others, can be broadly summarized by the following steps: providing a shoe body having a middle portion, the middle portion having a pocket formed therein; positioning a pocket insert at least partially within the pocket, wherein the pocket insert has a raised edge, and wherein a position of the pocket insert is adjustable relative to the shoe body; and removably securing the pocket insert in a stationary position at least partially within the pocket.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 4:
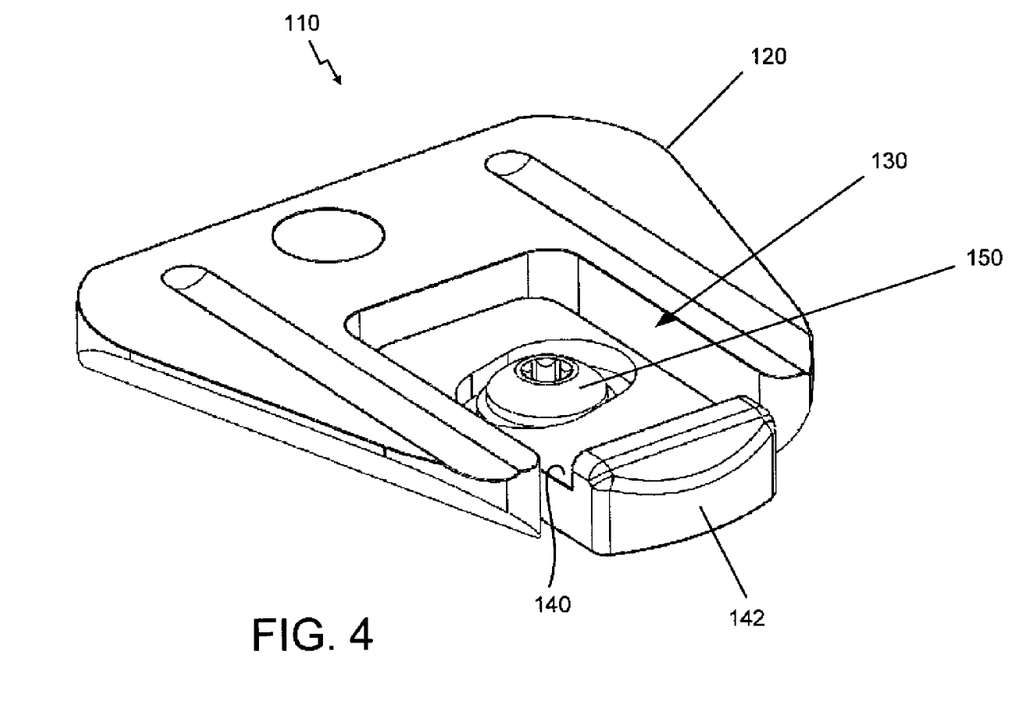
FIG. 4 is a plan view illustration of an adjustable mounting shoe, in accordance with a first exemplary embodiment of the present disclosure.

FIG. 4 is a plan view illustration of an adjustable mounting shoe 110, in accordance with a first exemplary embodiment of the present disclosure. The adjustable mounting shoe 110, which may be referred to herein simply as 'shoe 110' includes a shoe body 120. A middle portion of the shoe body 120 has a pocket 130 formed therein. A pocket insert 140 is positioned at least partially within the pocket 130. The pocket insert 140 has a raised edge 142, wherein the pocket insert 140 is movable relative to the shoe body 120. At least one fastener 150 is engageable with the pocket insert 140 to secure the pocket insert 140 in a stationary position at least partially within the pocket 130.

The shoe 110 may be used to retain mountable devices, such as optical devices, to a mounting structure, such as combat helmets, weapons, or other structures. The shoe 110 can be used with a variety of different optical devices that are well-known in the art, such as, for example, the PVS 14 night vision monocular. The shoe body 120 may be formed from a rigid, durable material, such as a metal or alloy, and generally has a dovetail shape where one side of the shoe body 120 is wider than another side, however other shaped shoe bodies 120 may be possible. As is shown in FIG. 4, the pocket 130 is formed in the middle section of the shoe body 120 such that the shoe body 120 forms at least some of the edges of the pocket 130. The pocket 130 may have a variety of shapes, sizes, and depths. For example, the pocket 130 may have a rectangular shape formed by edge walls of the shoe body 120 with one or more open edges formed where the shoe body 120 is absent. The base of the pocket 130 may be a closed surface which is either integral with the shoe body 120 or affixed to the shoe body 120. For example, some shoe bodies 120 may have a structure that provides a pocket 130 base surface, while other shoe bodies 120 may be used with other mounting components, such as base plates, to provide the base surface of the pocket 130. FIGS. 5-13 discuss using a base plate with the shoe 110.

The pocket insert 140 may be a unitary structure that is sized to fit at least partially within the pocket 130, such that when the pocket insert 140 is secured within the pocket 130, the combination of the shoe body 120 and pocket insert 140 allow the shoe 110 to function with existing mounting structures, such as helmet and weapon mounting structures used conventionally. The pocket insert 140 may be formed from the same material as the shoe body 120, commonly metals and alloys with coatings to ensure longevity in use. The pocket insert 140 is adjustable or movable within the pocket 130 relative to the shoe body 120. For example, the pocket insert 140 may have a number of different positions that it can be placed in while secured within the pocket 130. This adjustability of the position of the pocket insert 140 may allow the shoe 110 to be used with a wide range of mounting structures, since the pocket insert 140 can be positioned and re-positioned to correctly fit a particular mounting structure.

The at least one fastener 150 allows the pocket insert 140 to be secured within the pocket 130. The fastener 150 may be a threaded fastener that engages with the pocket insert 140, such as by being positioned within a hole within the pocket insert 140, and connects with another structure to secure the pocket insert 140 within the pocket 130. The other structure that the fastener 150 engages with may vary, depending on the design of the shoe 110. For example, the fastener 150 may commonly engage with a base of the pocket 130, which is formed either by the shoe body 120 or another mounting component, such as a base plate. Other configurations of the fastener 150 are available, including those where the fastener 150 is engaged between the pocket insert 140 and other portions of the shoe body 120, such as the walls of the shoe body 120 that form the pocket 130. The fastener 150 allows the pocket insert 140 to be removably secured within the pocket 130. In other words, the pocket insert 140 can be retained stationary within the pocket 130 by the fastener 150 in one position, and then the fastener 150 can be loosened to move the pocket insert 140 into another position.

Figure 5:
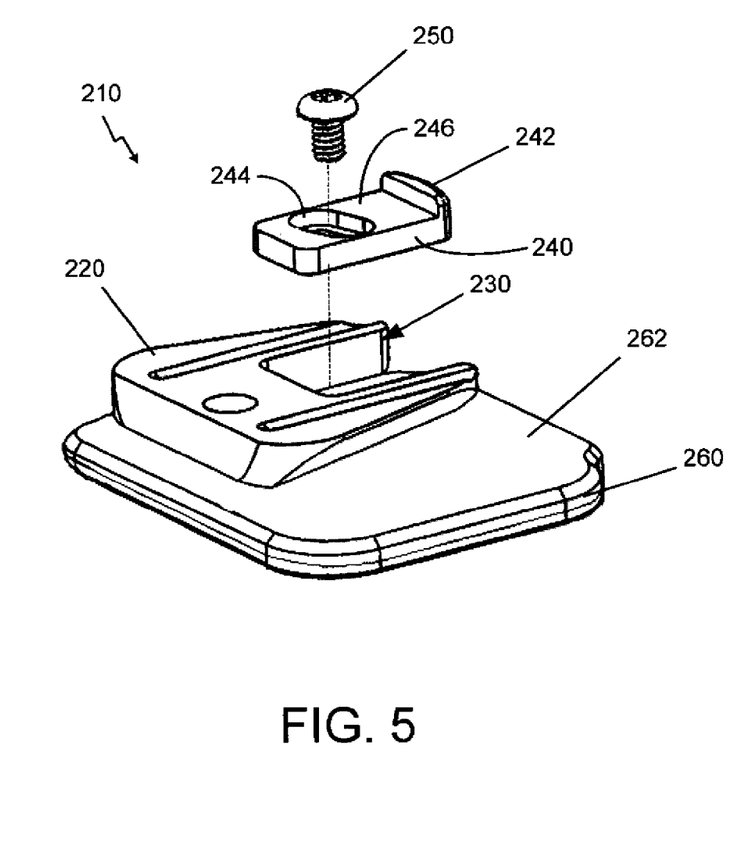
FIG. 5 is an exploded view illustration of an adjustable mounting shoe, in accordance with a second exemplary embodiment of the present disclosure.

FIG. 5 is an exploded view illustration of an adjustable mounting shoe 210, in accordance with a second exemplary embodiment of the present disclosure. The adjustable mounting shoe 210, which may be referred to herein as 'shoe 210' may be substantially similar to the adjustable mounting shoe 110 of the first exemplary embodiment, and may include any of the structures or functioning described with respect to any embodiment of this disclosure. The shoe 210 includes a shoe body 220. A middle portion of the shoe body 220 has a pocket 230 formed therein. A pocket insert 240 is positioned at least partially within the pocket 230. The pocket insert 240 has a raised edge 242, wherein the pocket insert 240 is movable relative to the shoe body 220. At least one fastener 250 is engageable with the pocket insert 240 to secure the pocket insert 240 in a stationary position at least partially within the pocket 230.

The shoe body 220 is mounted to a surface 262 of a base plate 260 such that the surface 262 of the base plate 260 forms a base surface of the pocket 230. The base plate 260 may be used to retain the shoe 220 to an optical device. For example, the base plate 260 may have a number of connectors, fasteners, or other structures which allow it to be connected to an optical device. In FIG. 5, the pocket 230 of the shoe 210 is open on one end and may also have a base surface formed from the top surface 262 of the base plate 260. The pocket insert 240 is sized to fit within the pocket 230 of the shoe body 220. The fastener 250 may be inserted through the hole 244 within the pocket insert 240 to engage the pocket insert 240. The base of the pocket 230 may have a threaded receiving hole where the fastener 250 can be engaged with, such that the fastener 250 can retain the pocket insert 240 within the pocket 230. The overall thickness of the pocket insert 240 is less than the thickness of the pocket 230, thereby allowing for a retractable locking member (FIGS. 11-12) to engage with the pocket 230. The raised edge 242 of the pocket insert 240 is sized to rise above the pocket insert 240, thereby providing an edge to the pocket 230 and a contact surface to engage with the retractable locking member. The pocket inset 240 may have a body portion 246 connected to the raised edge 242, wherein a height of the body portion 246 is less than a height of the raised edge 242. The height of the body portion 246 of the pocket insert 240 may also be less than a height of the shoe body 220.

Figures 6A, 6B, 6C:
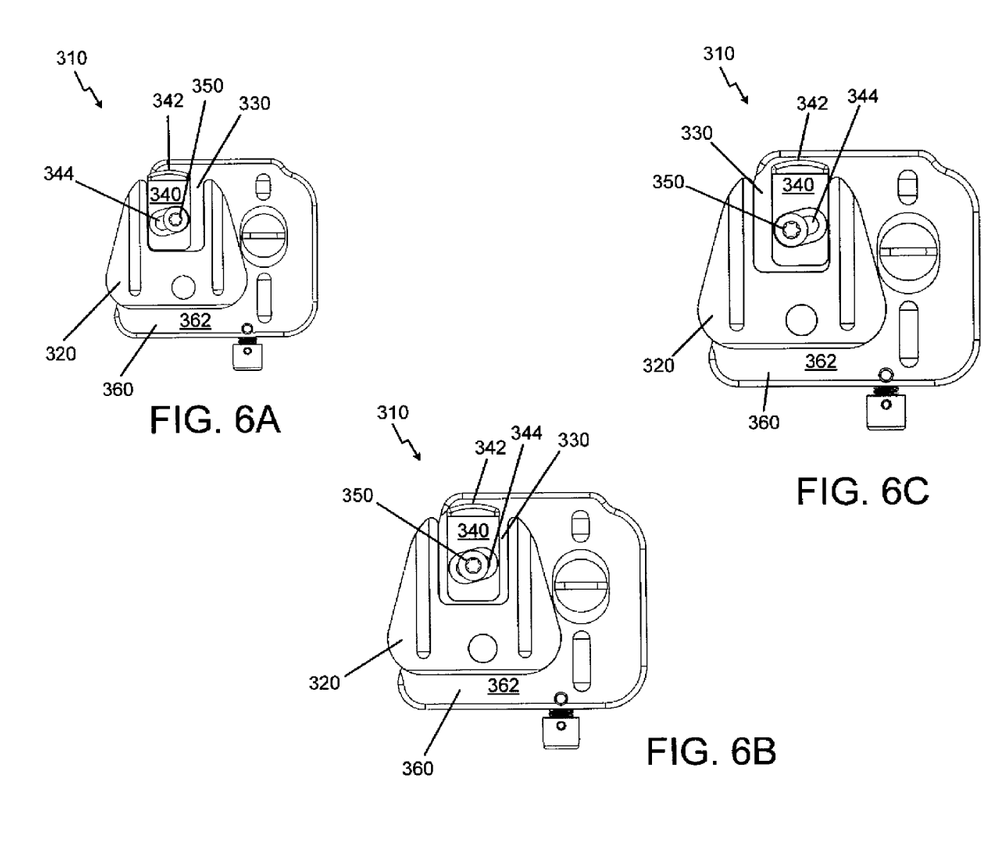
FIGS. 6A-6C are top view illustrations of an adjustable mounting shoe, in accordance with a third exemplary embodiment of the present disclosure.

FIGS. 6A-6C are top view illustrations of an adjustable mounting shoe 310, in accordance with a third exemplary embodiment of the present disclosure. The adjustable mounting shoe 310, which may be referred to herein as 'shoe 310' may be substantially similar to the adjustable mounting shoe 110 of the first exemplary embodiment, and may include any of the structures or functioning described with respect to any embodiment of this disclosure. The shoe 310 includes a shoe body 320. A middle portion of the shoe body 320 has a pocket 330 formed therein. A pocket insert 340 is positioned at least partially within the pocket 330. The pocket insert 340 has a raised edge 342, wherein the pocket insert 340 is movable relative to the shoe body 320. At least one fastener 350 is engageable with the pocket insert 340 to secure the pocket insert 340 in a stationary position at least partially within the pocket 330. The shoe body 320 is mounted to a surface 362 of a base plate 360 such that the surface 362 of the base plate 360 forms a base surface of the pocket 330.

The shoe body 320 has a substantially dovetail shape with the pocket 330 commonly located between a middle portion of the shoe body 320 and the narrow point of the dovetail shape. The pocket 330 may be formed within the shoe body 320 such that edges of the shoe body 320 define at least part of the structure of the pocket 330. A pocket insert 340 has a raised edge 342 forming at least one side of the pocket 330. The thickness of the pocket insert 340 is less than the depth of the pocket 330, thereby allowing the pocket insert 340 to be located beneath the surface of the shoe body 320. The raised edge 342 of the pocket insert 340, however, is sized to be thicker than the pocket insert 340, thereby allowing it to at least partially form one side of the pocket 340. The raised edge 342 of the pocket insert 340 acts as a contact point that a retractable locking member can engage with, as will be described further in detail.

The pocket insert 340 is movable and adjustable relative to the shoe body 320. The a least one fastener 350 is engageable with the pocket insert 340 to secure the pocket insert 340 in a stationary position at least partially within the pocket 330. In other words, when it is tightened, the fastener 350 may retain the pocket insert 340 stationary within the pocket 330 and when it is loosened, the fastener 350 may allow the pocket insert 340 to have a variety of positions within the pocket 330. When tightened, the fastener 350 may frictionally bias the pocket insert 340 to the upper surface 362 of the base plate 360, or is may frictionally bias the pocket insert 340 to another structure (such as a portion of the shoe body 320).

Various types of fasteners 350 arranged in various ways may allow for movement of the pocket insert 340. For example, as is shown in FIGS. 4-6C, a single fastener 350 may be positioned through a hole 344, which may be formed as an angled slot within the pocket insert 340. The portion of the hole 344 that the fastener 350 is located in may determine the position of the pocket insert 340 relative to the shoe body 320. FIGS. 6A-6C depict at least three of the positions that the pocket insert 340 may have. For example, in FIG. 6A, when the fastener 350 is positioned in one side of the hole 344, i.e. the outermost point of the hole 344, the pocket insert 340 may be in the fully retracted position wherein the raised edge 342 is positioned closest to the shoe body 320. In FIG. 6B, when the fastener 350 is positioned in a middle section of the hole 344, the raised edge 342 of the pocket insert 340 may be positioned in an intermediate position relative to the shoe body 320. And shown in FIG. 6C, when the fastener 350 is positioned along another side of the hole 344, i.e. an innermost point of the hole 344, the raised edge 342 of the pocket insert may be in a fully extended position.

The use of the angled slot as a hole 344 allows the pocket insert 340 to be movable relative to the shoe body 320 in at least two directions, if not more. For example, the pocket insert 340 is moveable in a first, forward/backward direction along the length of the pocket 330 and pocket insert 340 as well as in a second direction, lateral to or parallel to the length of the pocket 330 and the pocket insert 340. The ability for the pocket insert 340 to move in two substantially perpendicular directions translates into movements of the pocket insert. 340 that enlarge the length of the pocket 330 and move the raised edge 342 across the open edge of the pocket 330. The movement of the pocket insert 340 lateral to the length of the pocket insert 340 may help prevent radial movement of the pocket insert 340 about the fastener 350, thereby keeping the raised edge 342 of the pocket insert 340 angled correctly relative to the pocket 330.

While the fastener 350 and hole 344 of FIGS. 6A-6C have been provided as examples of how the pocket insert 340 can be moved to allow the shoe 320 to be adjustable, it is noted that other configurations for allowing movement of the pocket insert 340 are available. For example, instead of an angled slot as a hole 344, a vertical slot aligned along the length of the pocket insert 340 may be used. Any number of slots and fasteners 350 may be used. Additionally, a slot may be formed within the shoe body 320 or the base plate 360 instead of the pocket insert 340. Other designs for allowing the pocket insert 340 to be moved, adjusted, or relocated relative to the shoe body 320 are all considered within the scope of this disclosure.

Figures 7, 8:
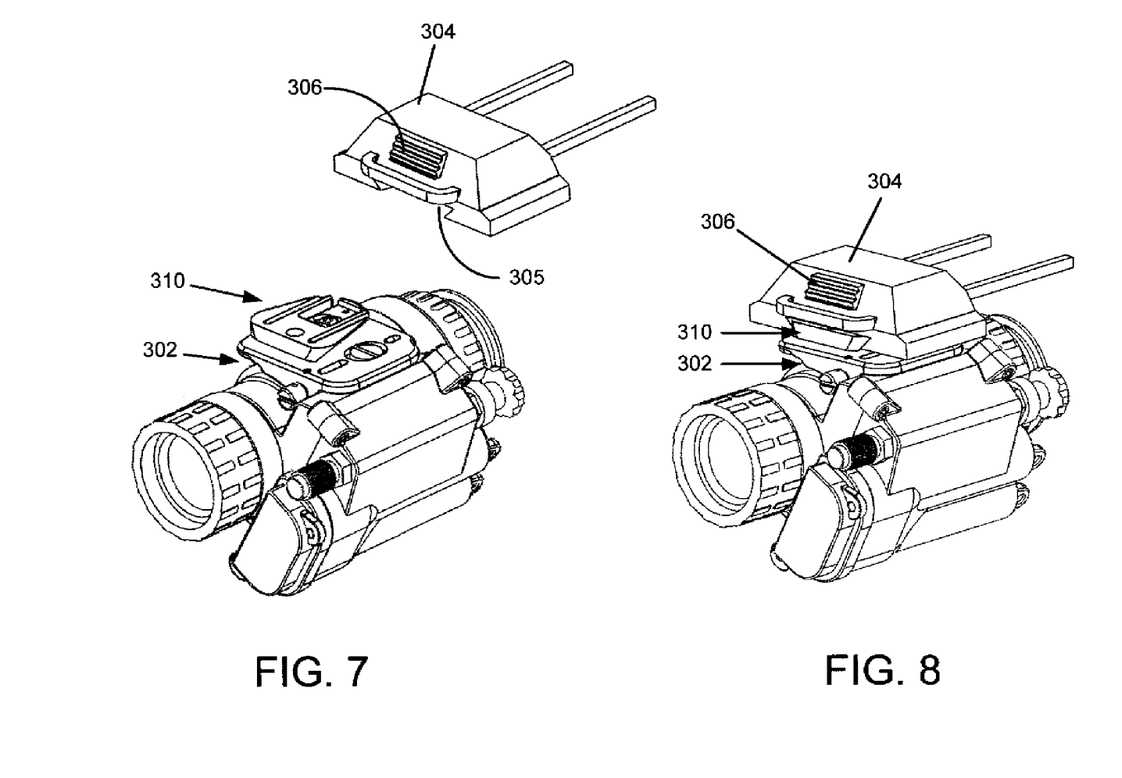
FIG. 7 is a plan view illustrations of an optical device mounting apparatus with adjustable mounting shoe, in accordance with the third exemplary embodiment of the present disclosure.
FIG. 8 is a plan view illustrations of an optical device mounting apparatus with adjustable mounting shoe engaged with a receiver, in accordance with the third exemplary embodiment of the present disclosure.

FIG. 7 is a plan view illustrations of an optical device mounting apparatus 302 with adjustable mounting shoe 310, in accordance with the third exemplary embodiment of the present disclosure. FIG. 8 is a plan view illustrations of an optical device mounting apparatus 302 with adjustable mounting shoe 310 engaged with a receiving structure 304, in accordance with the third exemplary embodiment of the present disclosure. The optical device mounting apparatus 302 of FIGS. 7-8 is formed, in part, from the base plate 360 depicted in FIGS. 6A-6C. The receiving structure 304, which is known in the art, includes a receiving pocket 305, a retractable locking member (not shown), and a button 306 for moving the retractable locking member. The shoe 310 is sized to fit within the receiving pocket 305, which allows the shoe optical device mounting apparatus 302 to be secured to the receiving structure 304. In FIG. 8, the adjustable mounting shoe 310 is illustrated in the fully engaged position within the receiving pocket 305 of the receiving structure 304.

Figure 9:
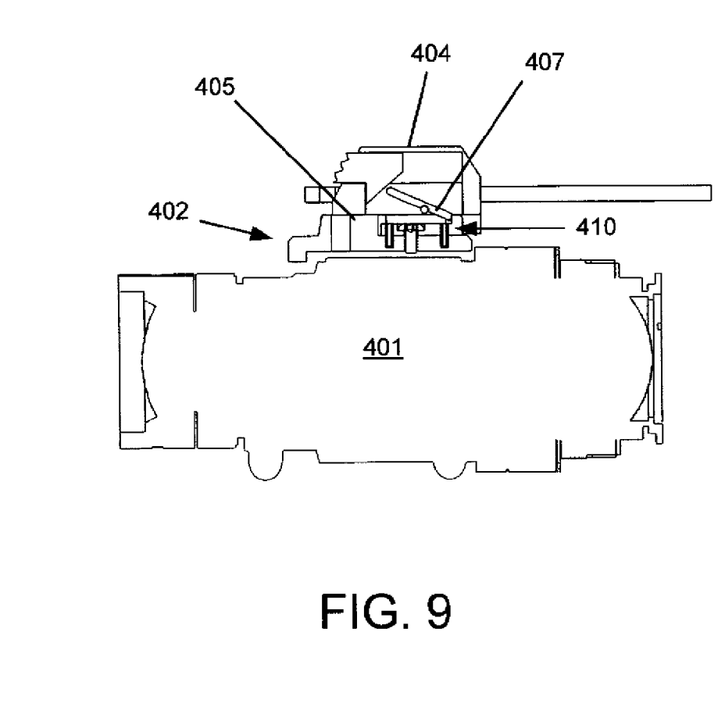
FIG. 9 is a cross-section view illustration of the optical device mounting apparatus with adjustable mounting shoe, in accordance with a fourth exemplary embodiment of the present disclosure.
Figure 10:
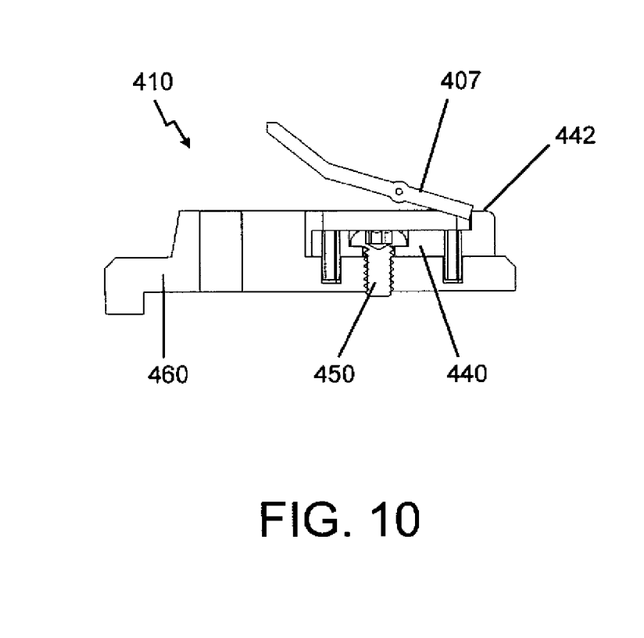
FIG. 10 is an enlarged cross-section view illustration the optical device mounting apparatus with adjustable mounting shoe, in accordance with the fourth exemplary embodiment of the present disclosure.

FIG. 9 is a cross-section view illustration of the optical device mounting apparatus 402 with adjustable mounting shoe 410, in accordance with a fourth exemplary embodiment of the present disclosure. FIG. 10 is an enlarged cross-section view illustration the optical device mounting apparatus 402 with adjustable mounting shoe 410, in accordance with the fourth exemplary embodiment of the present disclosure. The adjustable mounting shoe 410, which may be referred to herein as 'shoe 410' may be substantially similar to the adjustable mounting shoe 110 of the first exemplary embodiment, and may include any of the structures or functioning described with respect to any embodiment of this disclosure.

FIGS. 9-10 depict the retractable locking member 407 within the receiving structure 404. When the adjustable mounting shoe 410 is engaged with the receiving pocket 405, the retractable locking member 407 may extend into the pocket 430 to lock the adjustable mounting shoe 410 therein. Once secured in this position, the engagement between the adjustable mounting shoe 410 and the receiving pocket 405 allows the optical device 401 to be easily mounted and dismounted on various mounting structures.

As can be best seen in FIG. 10, when the retractable locking member 407 engages with the adjustable mounting shoe 410, it may contact the raised edge 442 of the pocket insert 440 positioned within the pocket 430 of the adjustable mounting shoe 410. Once the end of the retractable locking member 407 is lowered to contact the raised edge 442, it will prevent the pocket insert 440 from moving out of the receiving pocket 405 of the receiving structure 404. Since the pocket insert 440 is engaged with the adjustable mounting shoe 410 or base platform 460, the contact between the retractable locking member 407 and the raised edge 442 prevents movement of the shoe 410 relative to the receiving structure 404.

As discussed in the background, some components may be constructed with poor quality, such that components intended to engage together do not do so, especially with conventional shoes intended to universally fit with various mounting structures. While the conventional shoe may fit properly with a butterfly engagement, the pocket of the shoe is often in the wrong location, thereby causing the retractable locking member to not fit properly with the pocket. Thus, the conventional shoe may be fully positioned within the receiving pocket, yet the retractable locking member may not be capable of engaging with the pocket.

The adjustable mounting shoe 410 solves this problem by allowing the pocket 430 to be enlarged, thereby effectively allowing the pocket 430 to adjust to the position of the retractable locking member 407. The pocket 430 is enlarged by releasing the fastener 450 and moving the pocket insert 440 to a different location, and then securing the pocket insert 440 in place. This adjustment moves the raised edge 442 to enlarge the pocket, thereby allowing the retractable locking member 407 to engage with the raised edge 442. It is noted that when a retractable locking member 407 does not fit with the pocket 430 of the adjustable mounting shoe 410, the adjustable mounting shoe 410 is removed from the receiving pocket 405, and the position of the pocket insert 440 is adjusted and locked down before inserting the adjustable mounting shoe 410 into the receiving pocket 405 again. Thus, when the adjustable mounting shoe 410 is positioned within the receiving pocket 405 it is held is a stationary position relative to the optical device mounting apparatus 402.

Figure 11:
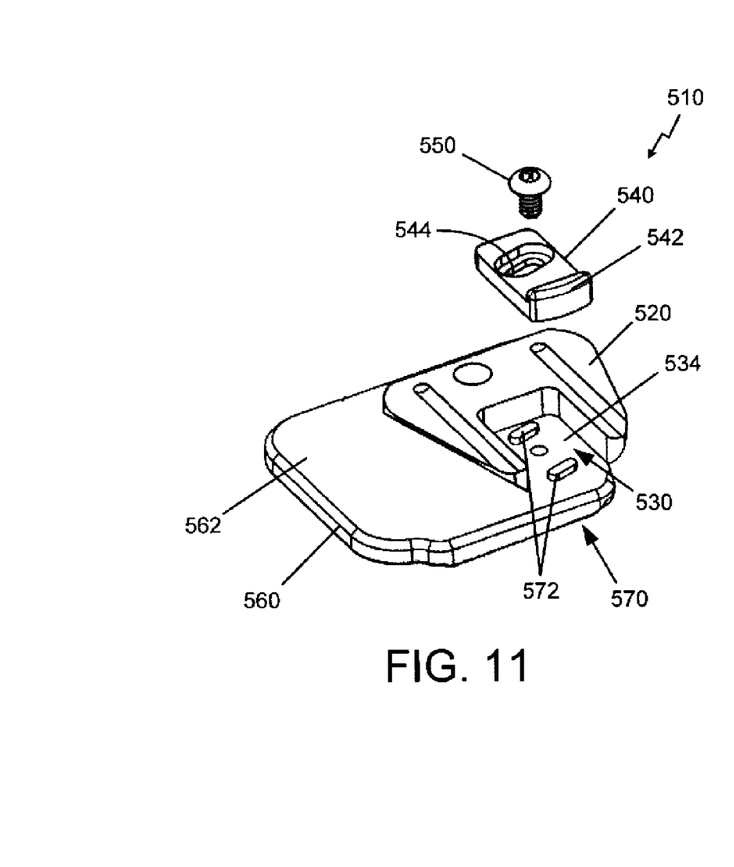
FIG. 11 is an exploded top view illustration of an adjustable mounting shoe, in accordance with a fifth exemplary embodiment of the present disclosure.
Figure 12:
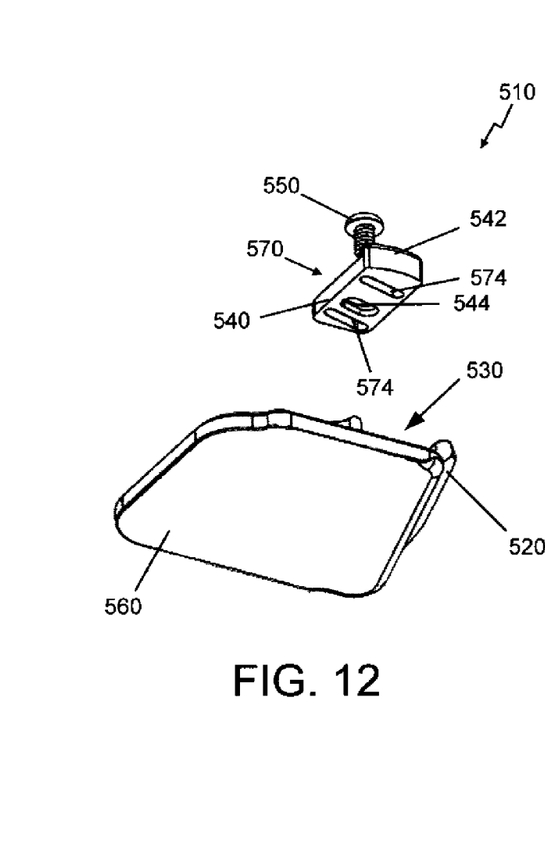
FIG. 12 is an exploded bottom view illustration of an adjustable mounting shoe, in accordance with the fifth exemplary embodiment of the present disclosure.

FIG. 11 is an exploded top view illustration of an adjustable mounting shoe 510, in accordance with a fifth exemplary embodiment of the present disclosure. FIG. 12 is an exploded bottom view illustration of an adjustable mounting shoe 510, in accordance with the fifth exemplary embodiment of the present disclosure. The adjustable mounting shoe 510, which may be referred to herein as 'shoe 510' may be substantially similar to the adjustable mounting shoes of the other exemplary embodiments disclosed herein, and may include any of the structures or functioning described with respect to any embodiment of this disclosure. The shoe 510 includes a shoe body 520. A middle portion of the shoe body 520 has a pocket 530 formed therein. A pocket insert 540 is positioned at least partially within the pocket 530. The pocket insert 540 has a raised edge 542, wherein the pocket insert 540 is movable relative to the shoe body 520. At least one fastener 550 is engageable with the pocket insert 540 to secure the pocket insert 540 in a stationary position at least partially within the pocket 530. The shoe body 520 is mounted to a base plate 560 having an upper surface 562 which forms the bottom of the pocket 530.

The shoe 510 is substantially similar to the adjustable mounting shoe 110, 210, 310 of FIGS. 4-6C. In addition to the fastener 550 which is used with the hole 544, shown as an angled slot, to secure the pocket insert 540 within the pocket 530, a guiding system (designated generally as 570) is used to guide movement of the pocket insert 540 within the pocket 530. The guiding system 570 may include at least one rail 572 formed on the base surface 534 of the pocket 530 and at least one slot 574 formed within the pocket insert 540. The rail 572 may engage the slot 574 when the pocket insert 540 is positioned within the pocket 530. This guiding system 570, which may be referred to by other names, such as a tab and slot system, may assist greatly with controlling the movement and/or positioning of the pocket insert 540. The rails 572 and slots 574 may be angled to match the angled design of the hole 544, or the rails 572 and slots 574 may have a different angle from the angled design of the hole 544. It is noted that there are many different structures that could be used to retain the pocket insert 540 within the pocket 530 or guide the movement or positioning of the pocket insert 540, all of which are considered within the scope of the present disclosure. While the designs presented herein provide exemplary teachings of how to achieve an adjustable pocket insert 540 relative to the pocket 530, other designs not included herein are also envisioned.

Figure 13:
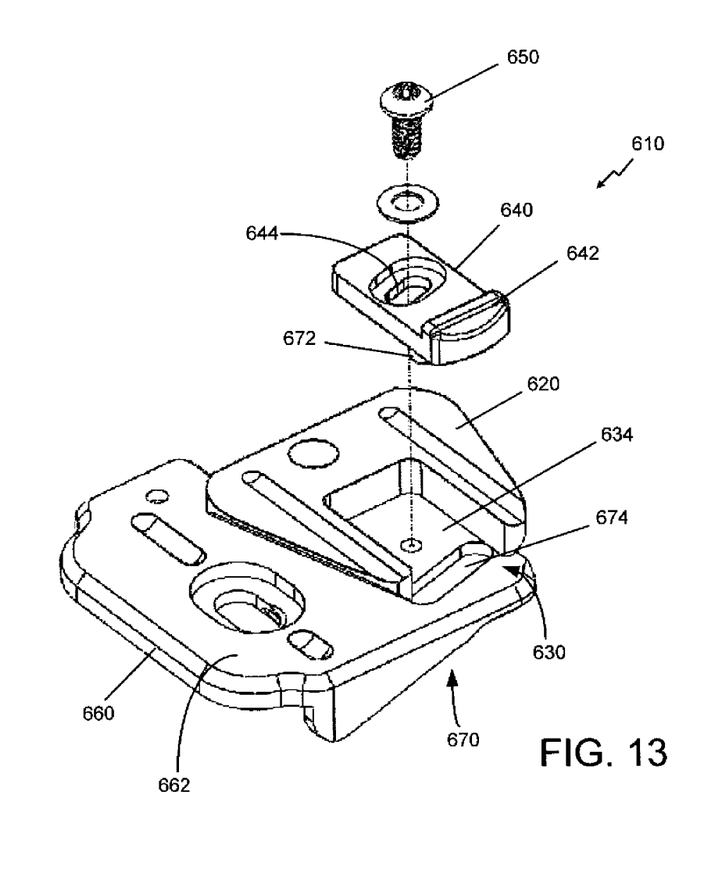
FIG. 13 is an exploded top view illustration of an adjustable mounting shoe, in accordance with a sixth exemplary embodiment of the present disclosure.
Figure 14:
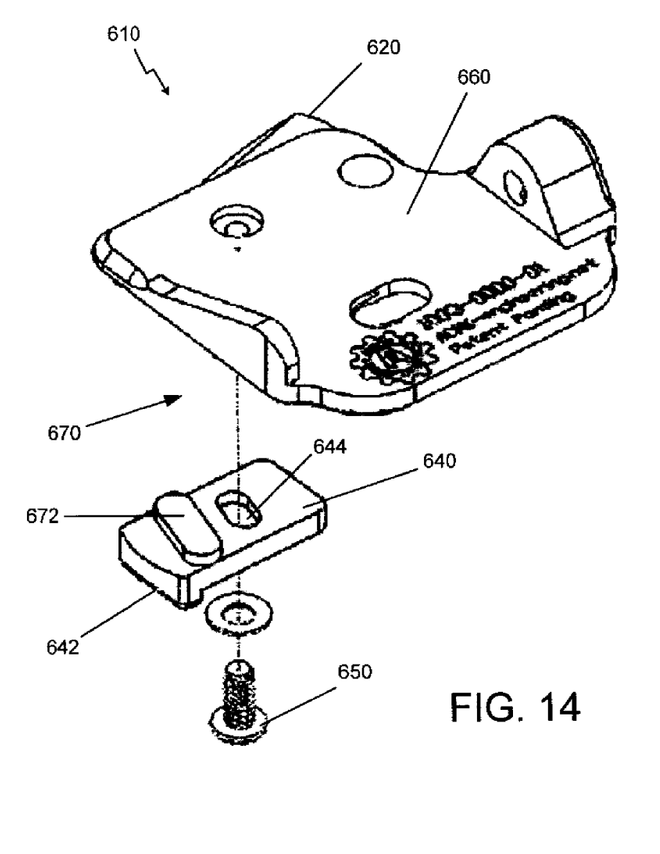
FIG. 14 is an exploded bottom view illustration of an adjustable mounting shoe, in accordance with the sixth exemplary embodiment of the present disclosure.

FIG. 13 is an exploded top view illustration of an adjustable mounting shoe 610, in accordance with a sixth exemplary embodiment of the present disclosure. FIG. 14 is an exploded bottom view illustration of an adjustable mounting shoe 610, in accordance with the sixth exemplary embodiment of the present disclosure. The adjustable mounting shoe 610, which may be referred to herein as 'shoe 610' may be substantially similar to the adjustable mounting shoes of the other exemplary embodiments disclosed herein, and may include any of the structures or functioning described with respect to any embodiment of this disclosure. The shoe 610 includes a shoe body 620. A middle portion of the shoe body 620 has a pocket 630 formed therein. A pocket insert 640 is positioned at least partially within the pocket 630. The pocket insert 640 has a raised edge 642, wherein the pocket insert 640 is movable relative to the shoe body 620. At least one fastener 650 is engageable with the pocket insert 640 to secure the pocket insert 640 in a stationary position at least partially within the pocket 630. The shoe body 620 is mounted to a base plate 660 having an upper surface 662 which forms the bottom of the pocket 630.

The shoe 610 is substantially similar to the adjustable mounting shoe 110, 210, 310 of FIGS. 4-6C and the adjustable mounting shoe 510 of FIGS. 11-12. In addition to the fastener 650 which is used with the hole 644, shown as an angled slot, to secure the pocket insert 640 within the pocket 630, a guiding system (designated generally as 670) is used to guide movement of the pocket insert 640 within the pocket 630. The guiding system 670 may include at least one rail 672 formed on a side of the pocket insert 640 that abuts the base surface 634 of the pocket 630 and at least one slot 674 formed within the base surface 634 of the pocket 630. The rail 672 may engage the slot 674 when the pocket insert 640 is positioned within the pocket 630. This guiding system 670, which may be referred to by other names, such as a tab and slot system, may assist greatly with controlling the movement and/or positioning of the pocket insert 640. The rails 672 and slots 674 may be angled to match the angled design of the hole 644, or the rails 672 and slots 674 may have a different angle from the angled design of the hole 644.

Figure 15:
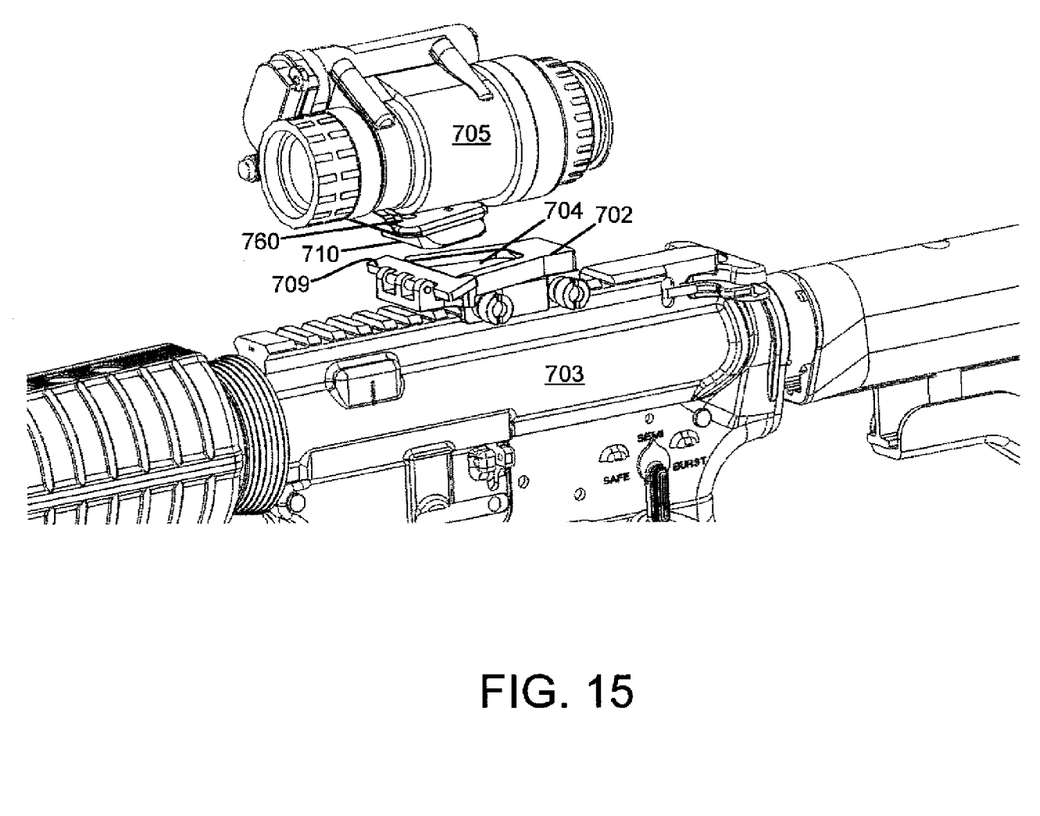
FIG. 15 is a plan view illustrations of an optical device mounting apparatus in use on a weapon, in accordance with a seventh exemplary embodiment of the present disclosure.

FIG. 15 is a plan view illustrations of an optical device mounting apparatus 702 having an adjustable mounting shoe 710 in use on a weapon 703, in accordance with a seventh exemplary embodiment of the present disclosure. The adjustable mounting shoe 710, which may be referred to herein as 'shoe 710' may be substantially similar to the adjustable mounting shoes of the other exemplary embodiments disclosed herein, and may include any of the structures or functioning described with respect to any embodiment of this disclosure. The optical device mounting apparatus 702 on the weapon 703 has a receiving structure 704 affixed thereto. An optical device 705 is connected with a base plate 760 formed integral with the shoe 710. However, unlike the receiving structure discussed relative to FIGS. 7-10, the receiving structure of FIG. 15 uses a butterfly clip 709 to secure the shoe 710 within the receiving structure 704.

The shoe 710 may be used interchangeably with receiving structures 704 that use butterfly clips 709 or that use retractable locking members (FIGS. 7-10), both of which are known in the art. As is known in the art, butterfly clips are commonly required for weapon mounts, due to the high forces produced when a weapon is discharged, whereas mounting shoes with pockets are conventionally used with helmet mounts. To account for the different types of mounting systems, the shoe 710 may be compatible with both types of mounting systems. When the shoe 710 is used with the butterfly clip 709, the pocket of the shoe 710 may be unused, since the butterfly clip 709 engages with the rear portion of the shoe body to secure the shoe 710 within the receiving structure 704.

Figure 16:
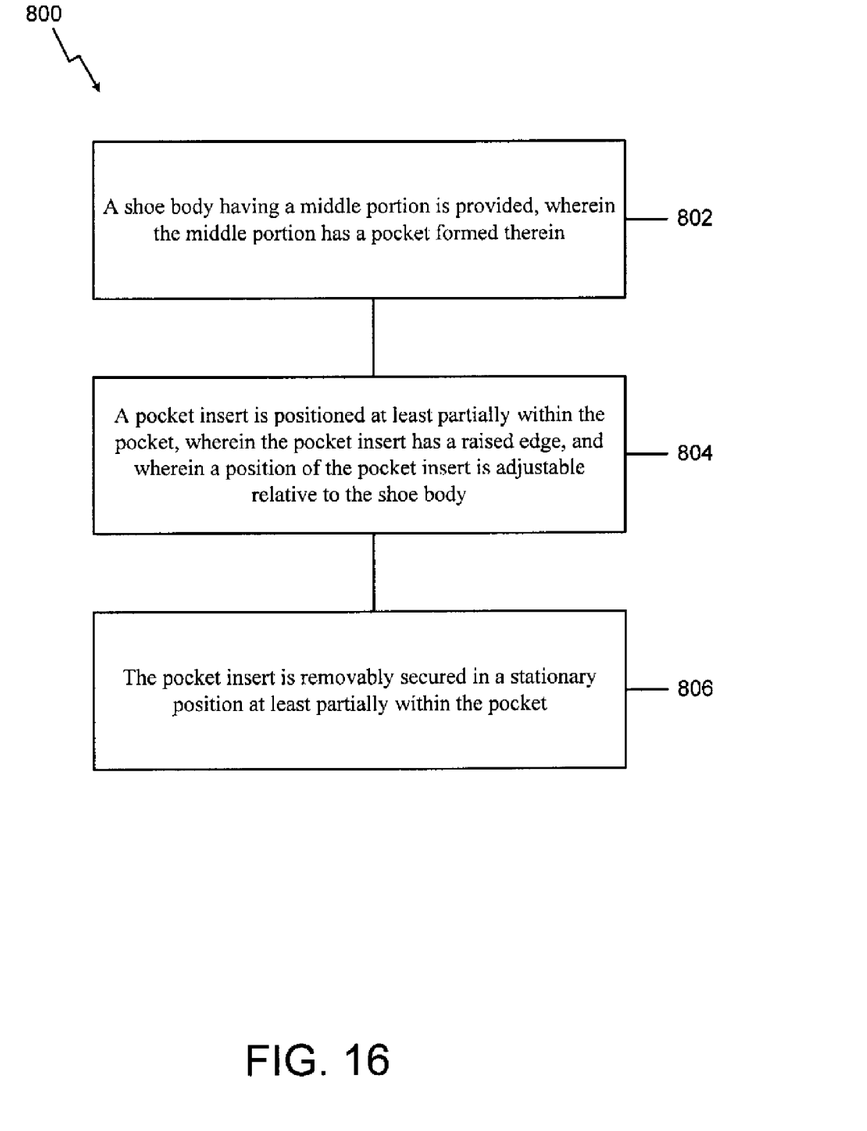
FIG. 16 is a flowchart illustrating a method of manufacturing an adjustable mounting shoe, in accordance with an eighth exemplary embodiment of the disclosure.

FIG. 16 is a flowchart 800 illustrating a method of manufacturing an adjustable mounting shoe, in accordance with an eighth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 802, a shoe body having a middle portion is provided, wherein the middle portion has a pocket formed therein. A pocket insert is positioned at least partially within the pocket, wherein the pocket insert has a raised edge, and wherein a position of the pocket insert is adjustable relative to the shoe body (block 804). The pocket insert is removably secured in a stationary position at least partially within the pocket (block 806).

The method may include any number of additional steps or processes, including any of the steps, processes, functions, or structures disclosed herein. For example, at least one fastener may be used to secure the pocket insert to a pocket base surface. The pocket insert may be guided between between at least two positions within the pocket, such with a guiding system. To adjust the pocket, the pocket insert may be moved in different directions, such as at least a first direction and a second direction in the pocket, wherein the first direction is substantially perpendicular to the second direction. The pocket may include a back edge, and when the pocket insert is positioned relative to the pocket body, the raised edge of the pocket insert may be moved further away from the back edge in one position than in another position.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An adjustable mounting shoe comprising:
    a shoe body;
    a middle portion of the shoe body having a pocket formed therein;
    a pocket insert positioned at least partially within the pocket, the pocket insert having a raised edge, wherein the pocket insert is movable relative to the shoe body in at least a first direction and a second direction; wherein the first direction is substantially perpendicular to the second direction; and
    at least one fastener engageable with the pocket insert to secure the pocket insert in a stationary position at least partially within the pocket.

2. The adjustable mounting shoe of claim 1, further comprising a base plate, wherein the shoe body is mounted to a surface of the base plate.

3. The adjustable mounting shoe of claim 2, wherein the surface of the base plate further comprises a base surface of the pocket, wherein the pocket insert is securable to the base surface of the pocket.

4. The adjustable mounting shoe of claim 3, wherein the at least one fastener further comprises a threaded fastener engaged between the pocket insert and the base surface of the pocket.

5. The adjustable mounting shoe of claim 1, wherein the pocket has an open edge.

6. The adjustable mounting shoe of claim 1, wherein the raised edge of the pocket insert forms at least one edge of the pocket.

7. The adjustable mounting shoe of claim 1, wherein the pocket insert further comprises a body portion connected to the raised edge, wherein a height of the body portion is less than a height of the raised edge.

8. The adjustable mounting shoe of claim 7, wherein the height of the body portion of the pocket insert is less than a height of the shoe body.

9. The adjustable mounting shoe of claim 1, wherein the pocket insert further comprises a hole formed therein, wherein the at least one fastener is positioned through the hole, and wherein a head of the at least one fastener is positioned below a top surface of the pocket insert.

10. The adjustable mounting shoe of claim 9, wherein the hole further comprises an elongate slot within the pocket insert.

11. A method of manufacturing an adjustable mounting shoe, the method comprising the steps of:
   providing a shoe body having a middle portion, the middle portion having a pocket formed therein;
   positioning a pocket insert at least partially within the pocket, by moving the pocket insert in at least a first direction and a second direction in the pocket, wherein the first direction is substantially perpendicular to the second direction, wherein the pocket insert has a raised edge, and wherein a position of the pocket insert is adjustable relative to the shoe body; and
   removably securing the pocket insert in a stationary position at least partially within the pocket.

12. The method of claim 11, wherein the step of removably securing the pocket insert in the stationary position at least partially within the pocket further comprises using at least one fastener to secure the pocket insert to a pocket base surface.

13. The method of claim 11, further comprising guiding the pocket insert between at least two positions within the pocket.

14. The method of claim 11, wherein the pocket further comprises a back edge, wherein the step of positioning the pocket insert at least partially within the pocket further comprises positioning the pocket insert in a first position and positioning the pocket insert in a second position, wherein the raised edge of the pocket insert is further away from the back edge in the second position than in the first position.

15. An adjustable optical device mount comprising:
   a base plate secured to an optical device;
   a shoe body mounted to the base plate, wherein a middle portion of the shoe body has a pocket formed therein;
   a pocket insert removably secured at least partially within the pocket, wherein a position of the pocket insert is adjustable between a plurality of positions within the pocket and movable in at least a first direction and a second direction, wherein the first direction is substantially perpendicular to the second direction;
   a mounting structure having a receiving area and a locking device, wherein the shoe body is at least partially positioned within the receiving area, and
   wherein the locking device engages with the pocket insert to retain the shoe body within the receiving area.

* * * * *